US006750757B1

(12) United States Patent
Gabig, Jr. et al.

(10) Patent No.: US 6,750,757 B1
(45) Date of Patent: Jun. 15, 2004

(54) APPARATUS AND METHOD FOR MANAGING LUGGAGE HANDLING

(75) Inventors: Jerome S. Gabig, Jr., Brownsboro, AL (US); Donald David Mondul, Dallas, TX (US)

(73) Assignee: Time Domain Corporation, Huntsville, AL (US)

( * ) Notice: Subject to any disclaimer, the term of this patent is extended or adjusted under 35 U.S.C. 154(b) by 556 days.

(21) Appl. No.: 09/694,151

(22) Filed: Oct. 23, 2000

(51) Int. Cl.⁷ ................................................ H04Q 5/22
(52) U.S. Cl. ................ 340/10.1; 340/572.1; 340/539.1; 340/539.11; 340/539.13; 340/825.49; 340/5.61; 340/571; 342/357.09; 40/6; 235/375
(58) Field of Search ............................ 340/10.1, 572.1, 340/539.1, 539.11, 539.13, 825.49, 5.61, 571; 40/6, 649; 342/357.09; 235/375

(56) References Cited

U.S. PATENT DOCUMENTS

| | | | |
|---|---|---|---|
| 4,531,312 A * | 7/1985 | Stoddart | 40/649 |
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,979,186 A | 12/1990 | Fullerton | 375/23 |
| 5,363,108 A | 11/1994 | Fullerton | 342/27 |
| 5,576,692 A * | 11/1996 | Tompkins et al. | 340/571 |
| 5,677,927 A | 10/1997 | Fullerton et al. | 375/200 |
| 5,687,169 A | 11/1997 | Fullerton | 370/324 |
| 5,832,035 A | 11/1998 | Fullerton | 375/210 |
| 6,206,282 B1 * | 3/2001 | Hayes et al. | 235/375 |
| 6,265,975 B1 * | 7/2001 | Zimmerman | 340/571 |
| 6,512,455 B2 * | 1/2003 | Finn et al. | 340/572.1 |
| 6,512,478 B1 * | 1/2003 | Chien | 342/357.09 |

* cited by examiner

Primary Examiner—Michael Horabik
Assistant Examiner—Yves Dalencourt
(74) Attorney, Agent, or Firm—Law Office of Donald D. Mondul

(57) ABSTRACT

A system for managing luggage handling includes: (a) a central information management appliance; (b) a plurality of portable impulse radio communication devices; and (c) at least one impulse radio transceiving instrument. The at least one impulse radio transceiving instrument, the plurality of communication devices and the central information management appliance are in communication. Selected portable impulse radio communication devices of the plurality of portable impulse radio communication devices are coded communication devices. Respective coded communication devices are attached with respective luggage items and communicate indication of at least one item relating to the respective luggage item.

30 Claims, 13 Drawing Sheets

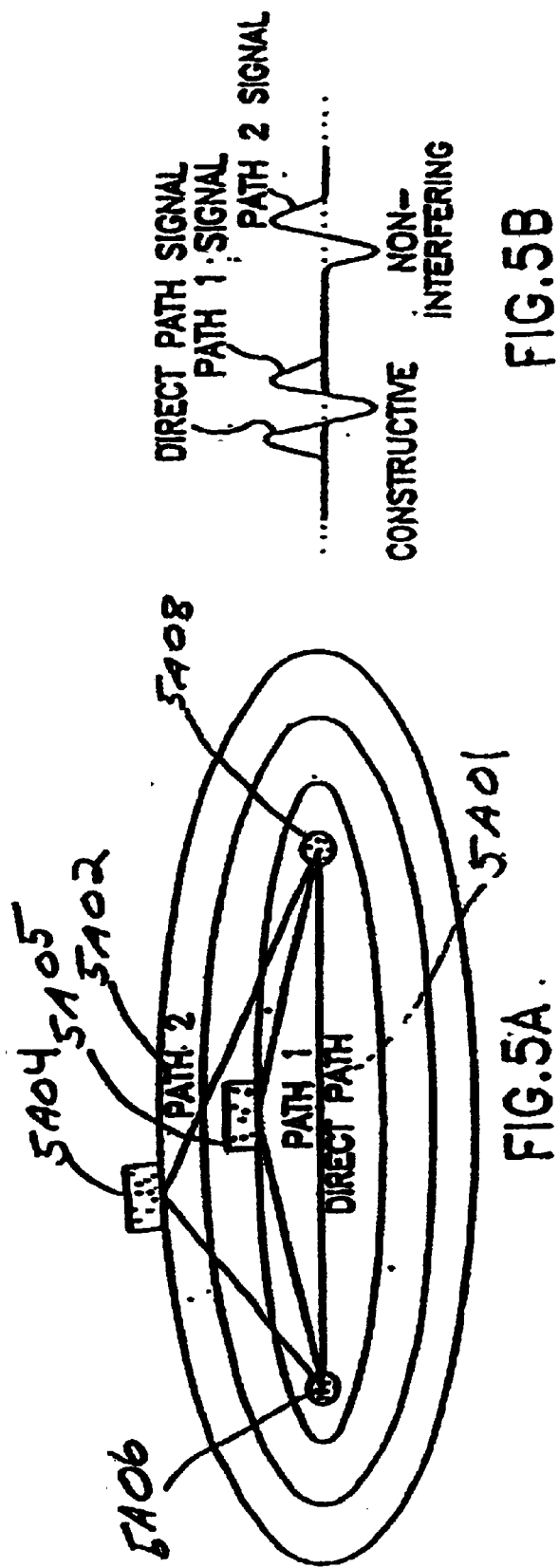

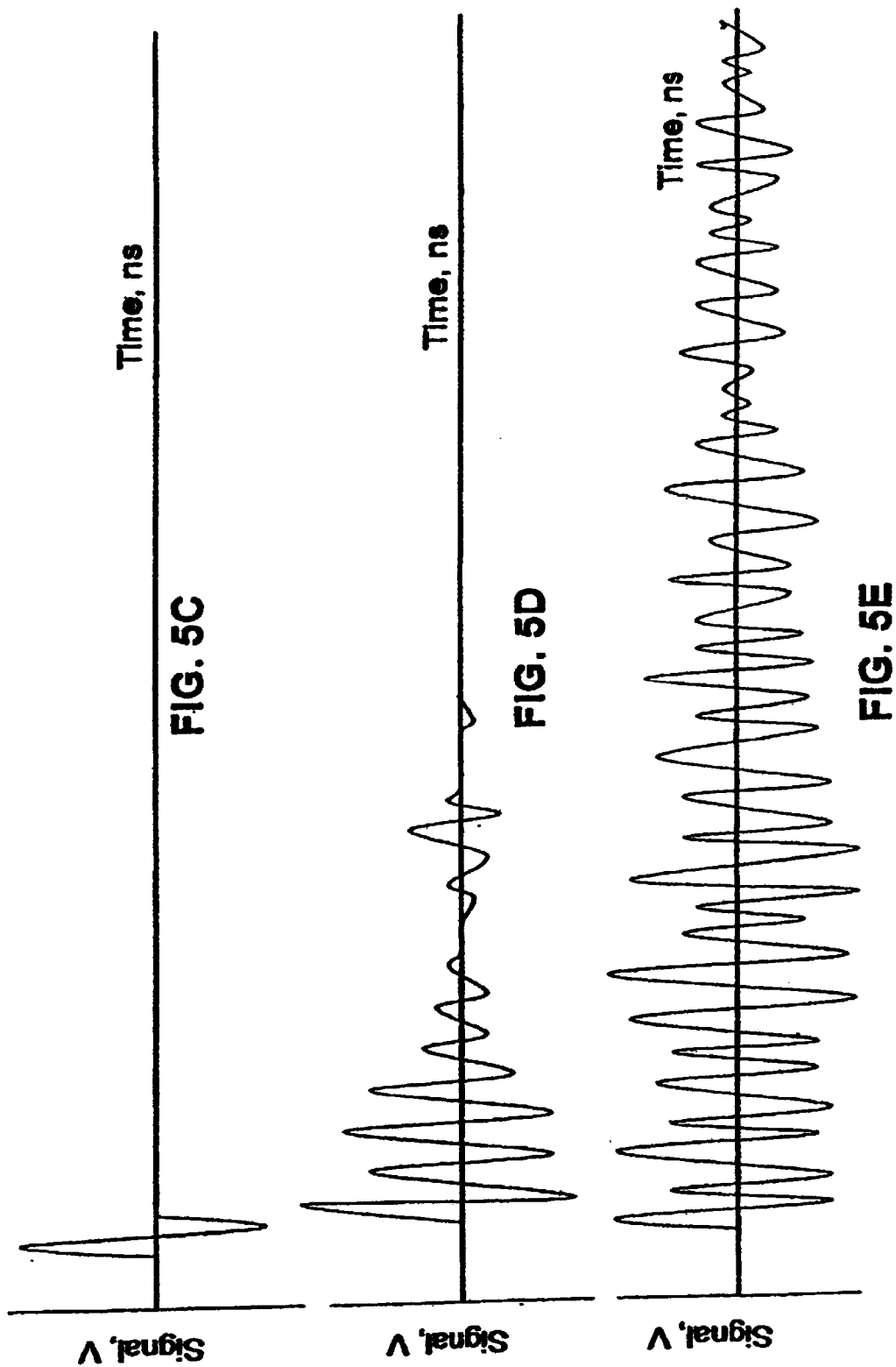

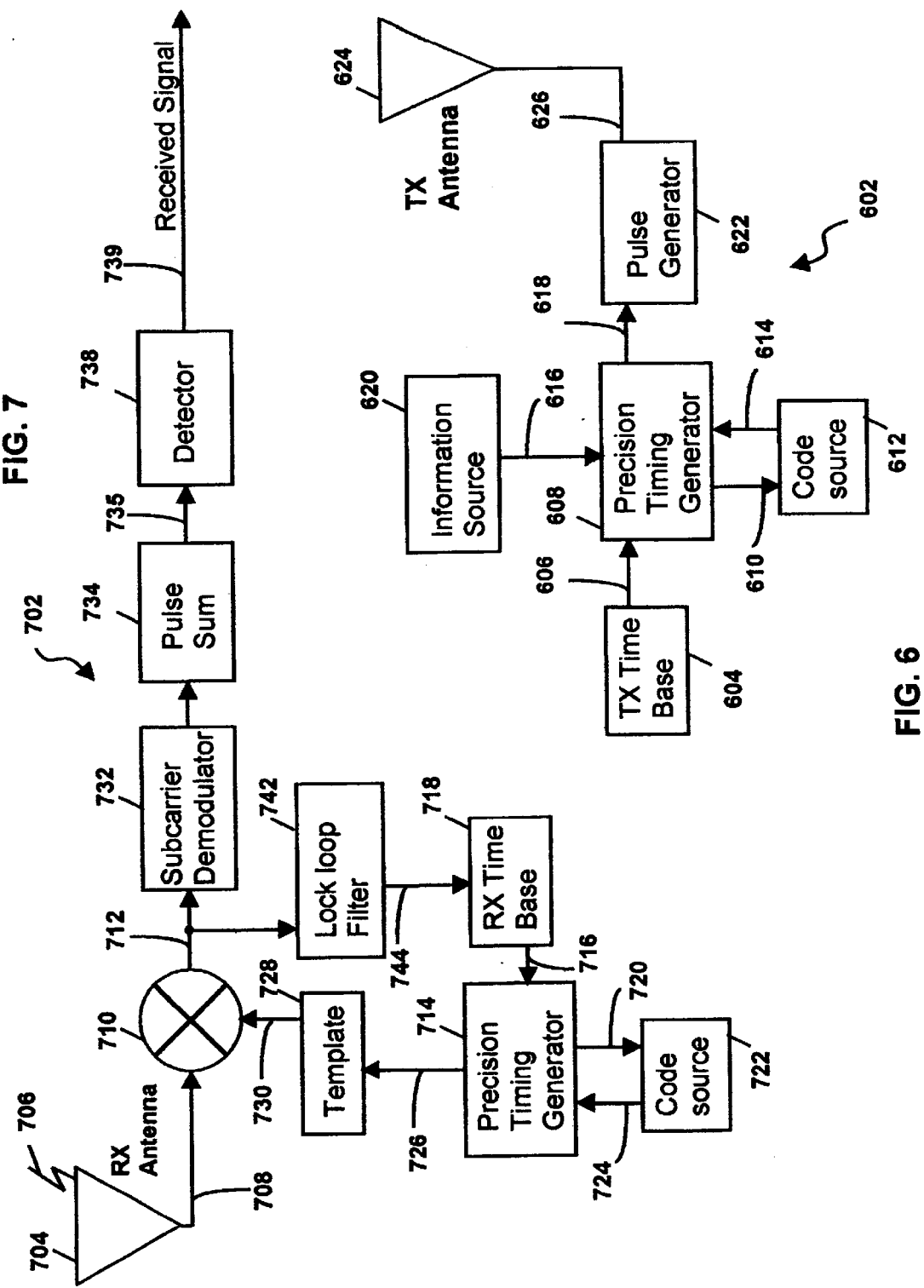

CORRESPONDING
TO EACH
Δt

APPARATUS AND METHOD FOR MANAGING LUGGAGE HANDLING

BACKGROUND OF THE INVENTION

1. Field of the Invention

The present invention relates generally to radio communication effected using impulse radio. More particularly the present invention provides an apparatus and method for managing luggage handling using impulse radio communications. The apparatus and method of the present invention are particularly useful in managing luggage handling in a facility, such as an airline, train, bus or other similar terminal, a hotel or any facility at which owner-passengers check luggage at a first locus for later retrieval at a second locus.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. Nos. 4,641,317 (issued Feb. 3, 1987), 4,813,057 (issued Mar. 14, 1989), 4,979,186 (issued Dec. 18, 1990) and 5,363,108 (issued Nov. 8, 1994) to Larry W. Fullerton. A second generation of impulse radio patents include U.S. Pat. No. 5,677,927 (issued Oct. 14, 1997) to Fullerton et al, and U.S. Pat. Nos. 5,687,169 (issued Nov. 11, 1997) and 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and/or for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

In common carrier passenger terminals, such as airline, train, bus or other transportation terminals, or at hotels or other facilities where owner-passengers check luggage at a first locus for later retrieval at a second locus there is a need for reliable and flexible luggage handling. That is, luggage must be routed for appropriate loading for transport. It is absolutely necessary that luggage reach the proper destination, preferably with or before its respective owner-passenger. Most preferably, luggage should travel with its owner-passenger. Flexibility for luggage handling involves such situations in which a gate or other embarkation locus changes, or an owner-passenger's itinerary changes. A luggage handling system must be capable of accommodating such changes while still getting the luggage to the same destination as the owner-passenger before or together with the owner-passenger.

Human resources for sorting, routing, tracking and rerouting luggage have been employed for a long time. Improvements over human resources have been sought to reduce costs (human resources are expensive), to reduce opportunities for human error and to provide flexibility that may be realized when using automatic luggage tracking systems.

Optical reading systems have been touted as serviceable. However, optical reading systems have been foiled by folded, bent, torn or otherwise unreadable tags. Other line-of-sight or near-range systems have included resonant tags that may excite a reader at ranges of approximately one meter. Such systems are at best a partial improvement over human resources, but are not an entire solution.

Radio frequency (RF) tags using amplitude modulation (AM) or frequency modulation (FM) technologies have been proposed, but they are limited in the number of individual luggage pieces that can be discerned. A saturation level is reached rather quickly at which identification signals for respective luggage pieces begin to interfere among each other. Identification information may be broadcast by such AM or FM RF tags, but location information is less reliably obtained from radio signals using such prior art systems.

The present invention provides a duplex communication-capable identification token, such as a tag, for employing impulse radio technology to announce identification and location for a respective luggage item. Such a duplex communication capability enables notification of a respective luggage item identifier tag that a change has occurred which requires rerouting of the respective luggage item. A change that may occasion such a notice may include, for example, a gate change for departure of an aircraft, a flight change for a given owner-passenger, or a change of luggage carousel for luggage collection for an arriving flight or a similar change. The rerouting that may be required to respond to such a change may accommodate a new locus for embarkation for travel, or a new collection locus for an owner-passenger to retrieve his luggage item after debarkation.

A luggage handling system may provide for automatic rerouting from one embarkation/debarkation locus to another such locus. A simpler (and, hence, lower cost) system may simply provide for an alert capability. An alert capability preferably enables an individual luggage item to respond to receiving notice of a change by alerting a human operator that it is a luggage item requiring attention. Such an alerting may be effected by any one or more of several means including, for example, a lighted identification of the luggage tag or a radio communication notice-response to a control station. Such a radio communication notice-response may indicate that special attention is required of a luggage item, and may include the location of the luggage item. The notice-response may be relayed by the central station to a locus near the location of the affected luggage item for intervention by a human operator to effect rerouting. Alternatively, the notice-response may be employed by the luggage handling system to commence an automatic pick-and-place operation to return the luggage item to a transport apparatus for rerouting to a new embarkation/debarkation locus.

One embodiment of the present application contemplates placing a RF tag on an owner-passenger's luggage item while the owner-passenger checks in for a flight at an airport. The check-in procedure employs equipment that effects entering of an identifier code for the RF tag in association with the owner-passenger's name being added to the passenger manifest for his flight. Other information associated with the RF tag identifier and the owner-passenger's identity are the flight number, an embarkation locus for the flight at which luggage is to be loaded, and a debarkation locus at the destination airport for the owner-passenger to retrieve the luggage item.

The debarkation information may be provided to the RF tag after arrival at the destination airport by radio communication link at the destination airport.

In the event that there is a change in any of the parameters entered into the RF tag, the new information may be sent to the RF tag via an RF communication network employing impulse radio technology at the embarkation airport or at the debarkation airport, as appropriate. Changes in flight arrangements may be communicated to the RF tag using the RF communication network if the owner-passenger alters his arrangements.

If the owner-passenger is traveling via an intermediate airport in making a multi-leg journey, the RF tag may be used to indicate its proper new embarkation locus for following the owner-passenger to his ultimate destination. Moreover, if the owner-passenger alters his itinerary en route, the RF tag may be "notified" using the RF communication network and the luggage item may be rerouted to accompany the owner-passenger. This arrangement may be especially useful in situations involving an owner-passenger interrupting (rather than merely altering) his trip at an interim airport. In such a case, the RF tag may be "notified" and transfer of the luggage item may be interrupted to allow the luggage item to remain at the interim airport instead of its being forwarded on to the original ultimate destination airport.

The immediate "notification" capability of the luggage handling system of the present invention would be especially useful in times when massive flight cancellations are imposed, as often occurs during periods of bad weather. The luggage handling system of the present invention will facilitate return of luggage items to their respective owner-passengers in such circumstances.

RF tags may be removed by baggage handlers after arrival at a destination airport and before placing luggage on the carousel from which owner-passengers will retrieve their luggage items. Removed RF tags may be deprogrammed and recycled for use with later owner-passengers. In one embodiment of the present invention, RF tags include a rechargeable power source that may be recharged periodically to ensure their proper performance with later owner-passengers. In an alternate embodiment, lower cost RF tags may be employed that are not removed for recycling.

It would be preferable for a luggage handling system to be able to automatically reroute luggage to a proper embarkation (or debarkation) locus to respond to changes in transportation arrangements of whatever nature. A luggage handling system should at least identify luggage pieces affected by changes in transportation arrangements (e.g., gate changes or flight changes) to facilitate intervention by human operators to implement an appropriate response to such a change.

There is a need for a luggage handling system that can automatically route individual luggage pieces to proper embarkation or debarkation loci appropriate for accompanying respective owner-passengers of the luggage pieces.

There is a need for a luggage handling system that can react to changes in transportation arrangements to effect proper delivery of luggage pieces to loci appropriate for retrieval of luggage items by respective owner-passengers of the luggage pieces.

SUMMARY OF THE INVENTION

A system for managing luggage handling comprises: (a) a central information management appliance; (b) a plurality of portable impulse radio communication devices; and (c) at least one impulse radio transceiving instrument. The at least one impulse radio transceiving instrument, the plurality of communication devices and the central information management appliance are in communication. Selected portable impulse radio communication devices of the plurality of portable impulse radio communication devices are coded communication devices. Respective coded communication devices are attached with respective luggage items and communicate indication of at least one item relating to the respective luggage item.

It is therefore an object of the present invention to provide a luggage handling system that can automatically route individual luggage pieces to proper embarkation or debarkation loci appropriate for accompanying respective owner-passengers of the luggage pieces.

It is a further object of the present invention to provide a luggage handling system that can react to changes in transportation arrangements to effect proper delivery of luggage pieces to loci appropriate for retrieval of luggage items by respective owner-passengers of the luggage pieces.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 5A illustrates a typical geometrical configuration giving rise to multipath received signals.

FIG. 5B illustrates exemplary multipath signals in the time domain.

FIGS. 5C–5E illustrate a signal plot of various multipath environments.

FIG. 6 illustrates a representative impulse radio transmitter functional diagram.

FIG. 7 illustrates a representative impulse radio receiver functional diagram.

DETAILED DESCRIPTION OF THE EMBODIMENTS

Overview of the Invention

Figure 1B:
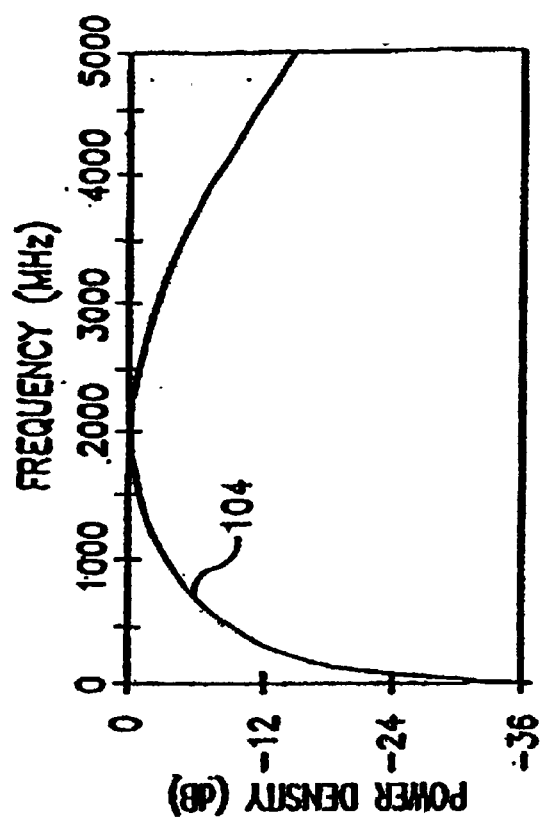
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1A:
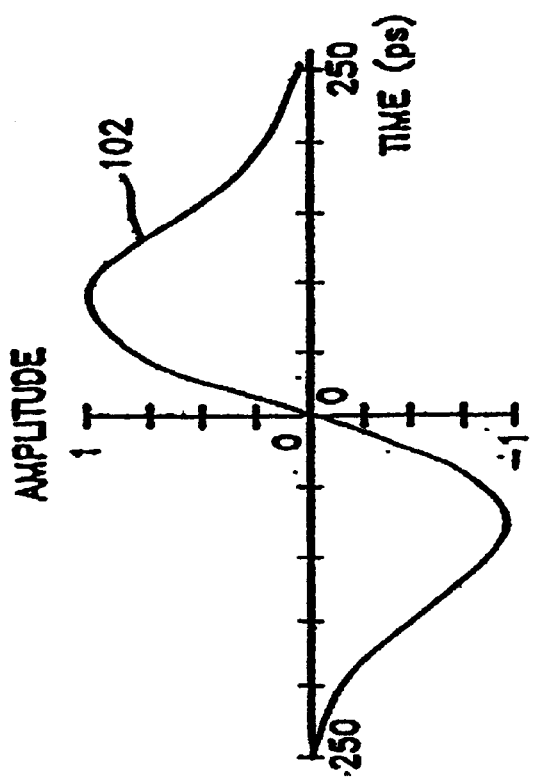
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
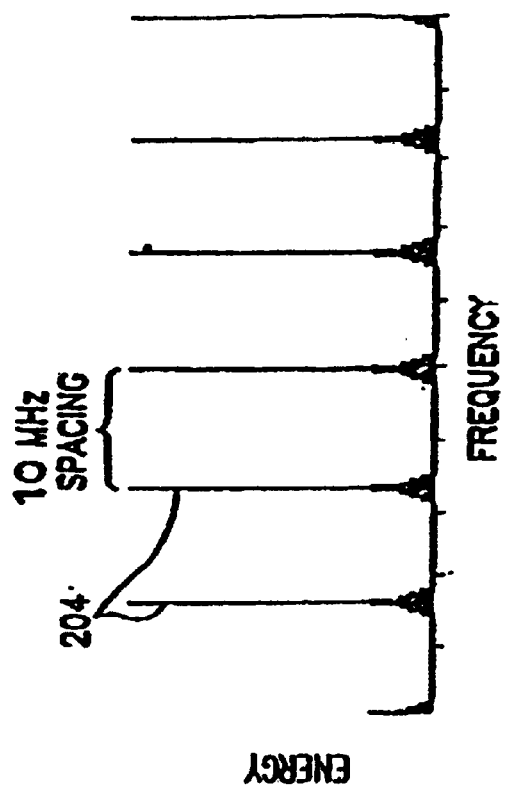
FIG. 2B illustrates the frequency domain amplitude of the waveform of FIG. 2A.
Figure 2A:
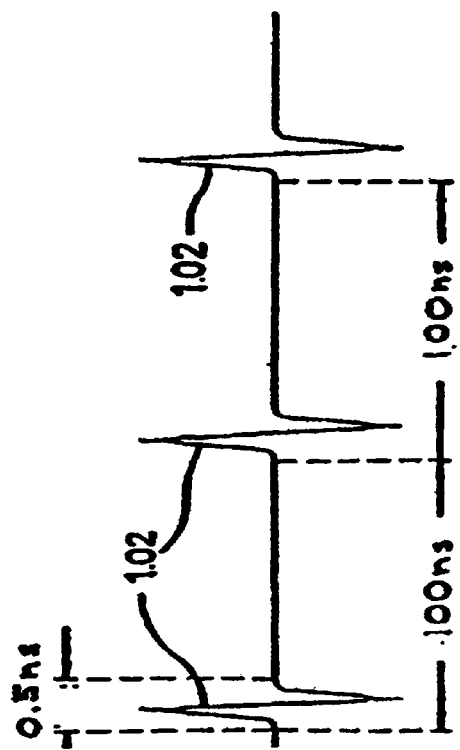
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
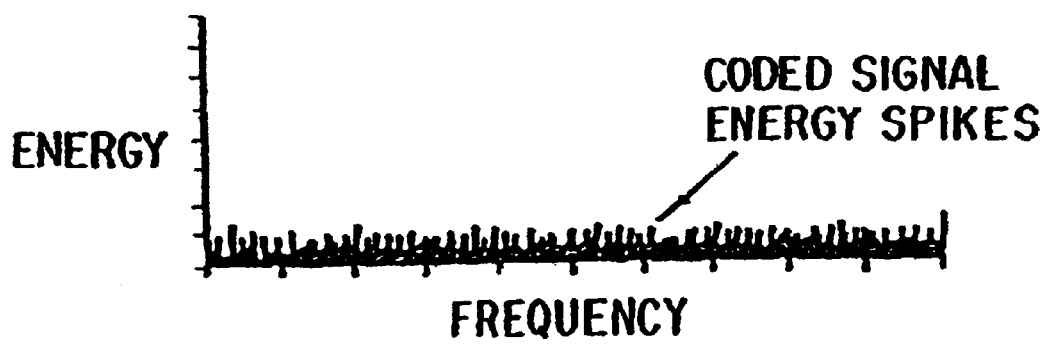
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one users sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
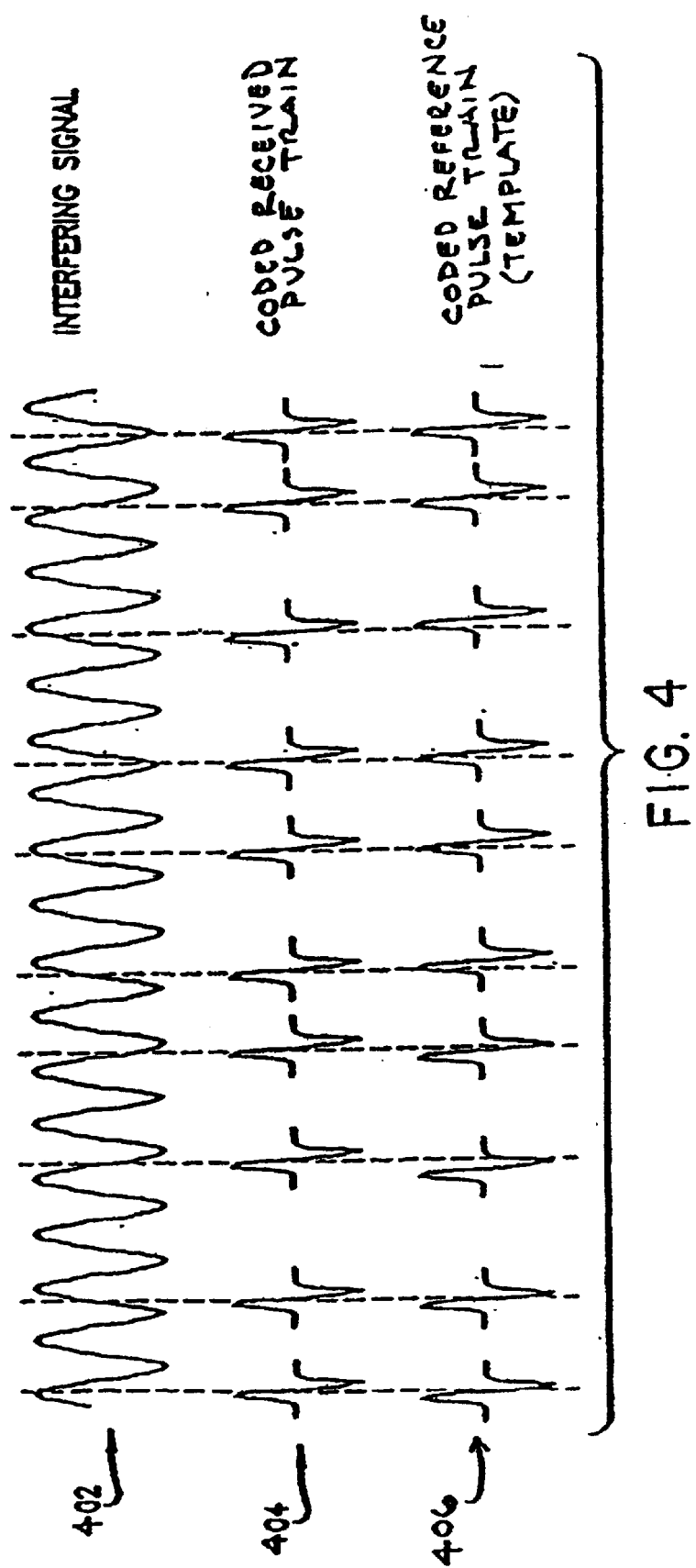
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be canceled simultaneously and precisely while blocking the direct path—a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sqrt{2}\ \sigma$ is the RMS amplitude of the combined multipath signals.

Figure 5F:
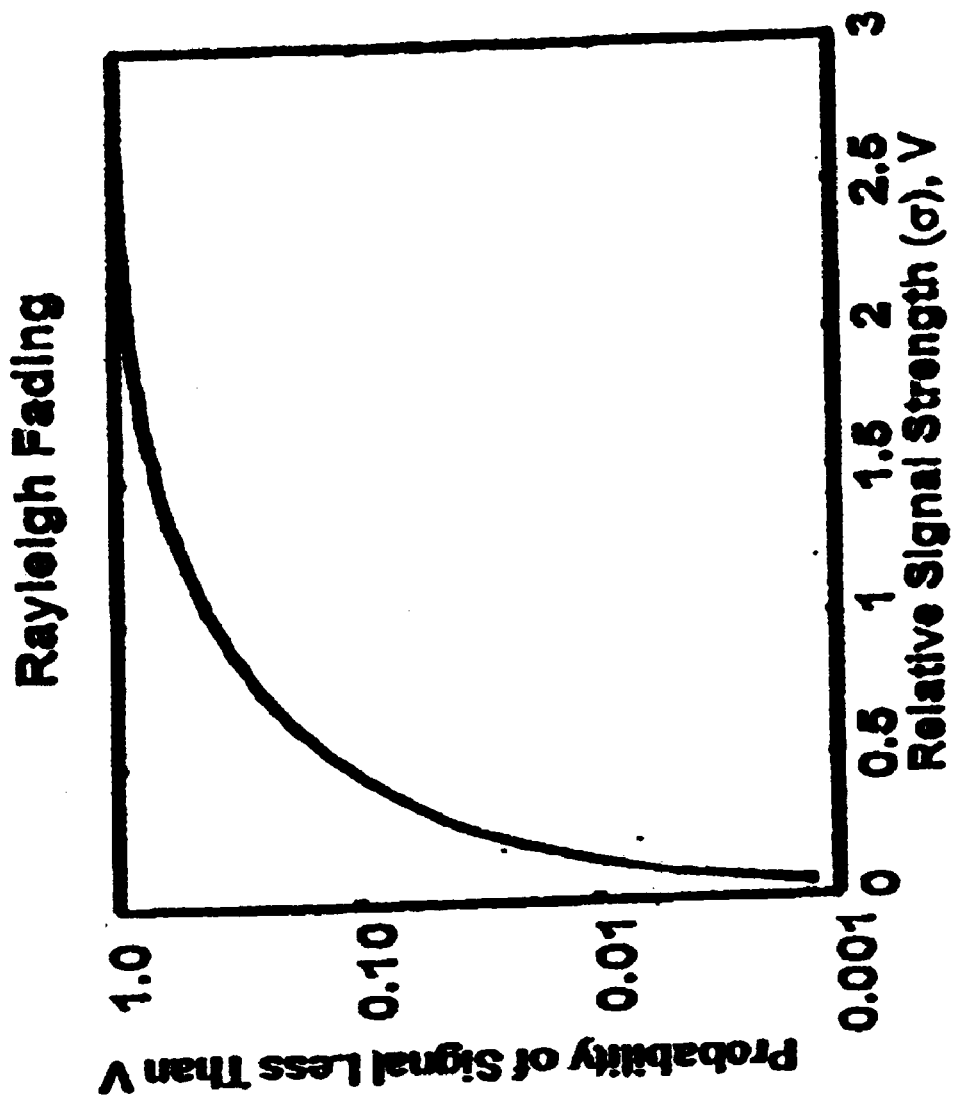
FIG. 5F illustrates the Rayleigh fading curve associated with non-impulse radio transmissions in a multipath environment.

This distribution shown in FIG. 5F. It can be seen in FIG. 5F that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
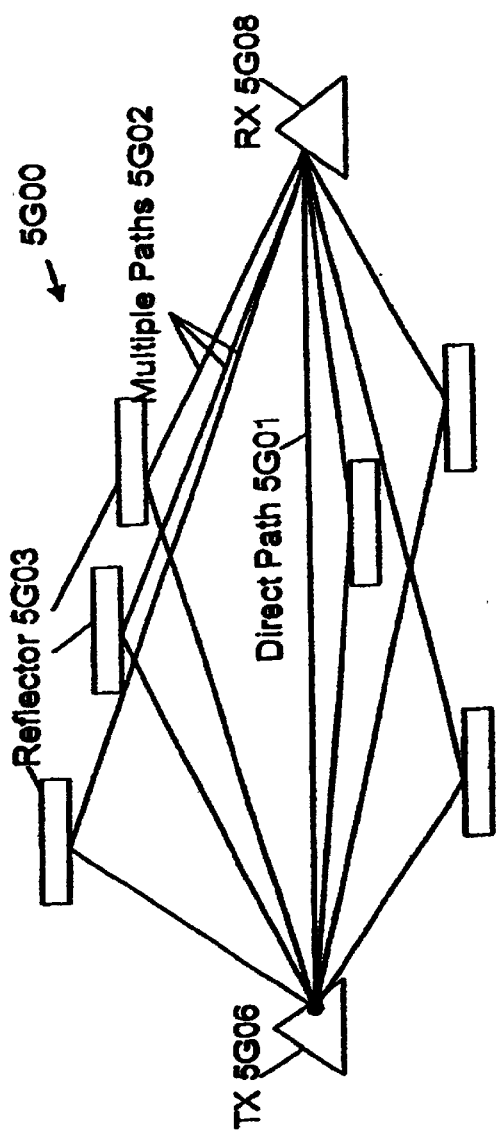
FIG. 5G illustrates a plurality of multipaths with a plurality of reflectors from a transmitter to a receiver.
Figure 5H:
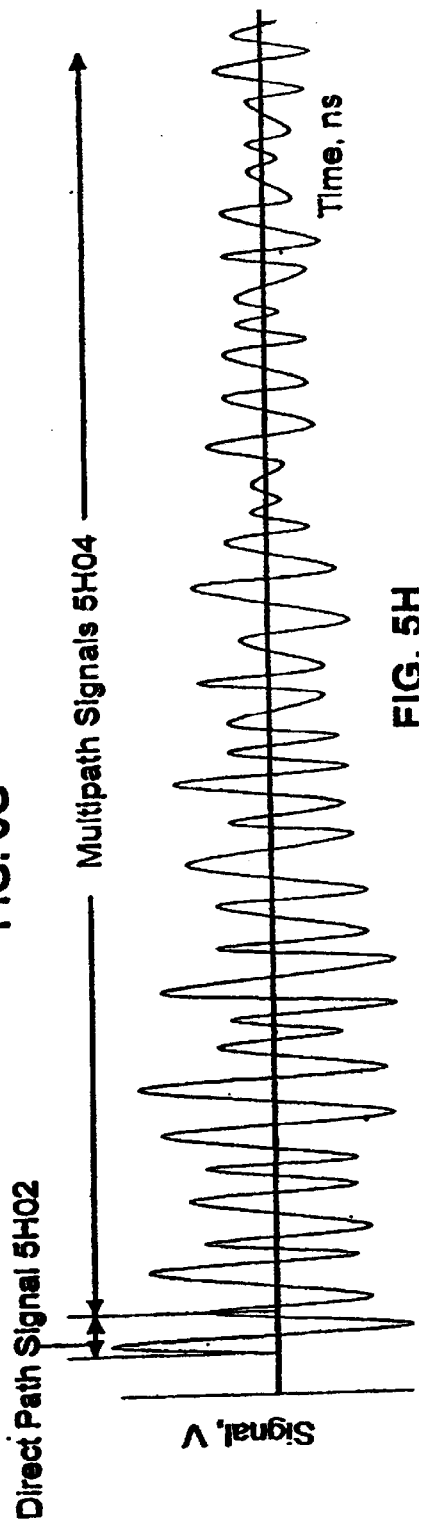
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIG. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser.

No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
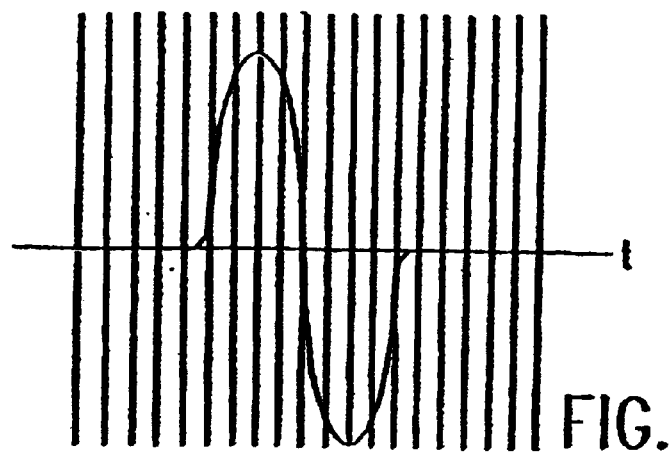
FIG. 8A illustrates a representative received pulse signal at the input to the correlator.
Figure 8B:
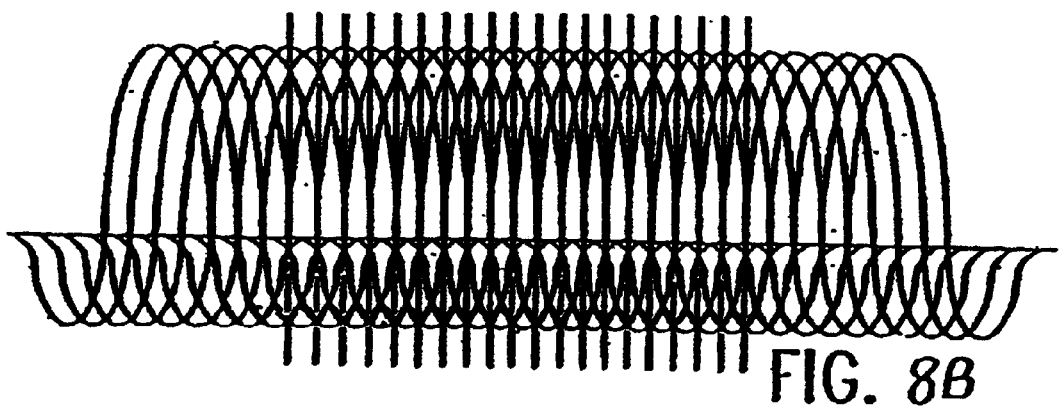
FIG. 8B illustrates a sequence of representative impulse signals in the correlation process.
Figure 8C:
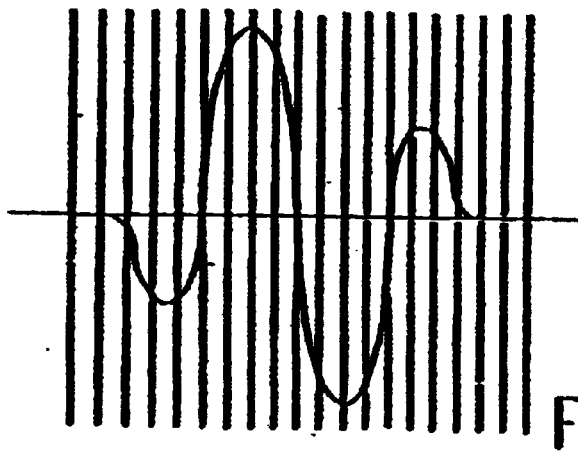
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse. Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

Impulse Radio as Used in the Present Invention

When utilized in a luggage handling system, the characteristics of impulse radio significantly improve the state of the art. A capability to distinguish a large number of users, an ability to provide location information and low power duplex communications manifested as small packages having long battery life in a tag embodiment all contribute to a luggage handling system of superior capabilities.

DETAILED DESCRIPTION OF THE DRAWINGS

Figure 9:
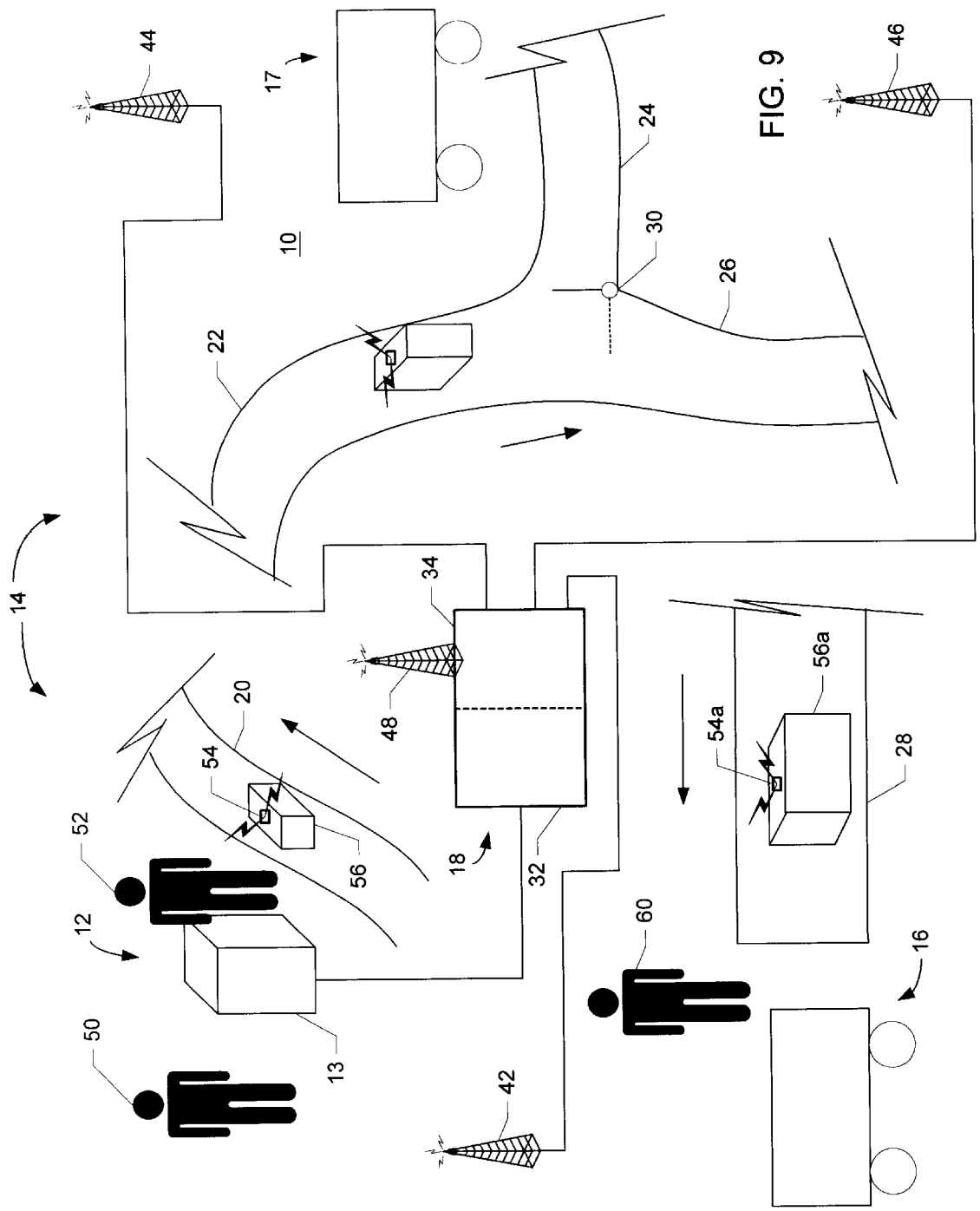
FIG. 9 is a schematic diagram illustrating a luggage handling system according to the present invention.

FIG. 9 is a schematic diagram illustrating a luggage handling system according to the present invention. In FIG. 9, a luggage handling system 10 includes a check-in station 12, an automated luggage delivery system 14, luggage embark/debark stations or loci 16, 17 and a luggage handling system control, or central information appliance 18. Luggage handling system 10 is configured for use with such facilities as airport terminals, bus terminals, train terminals, hotels or other facilities where individual owner-passengers may check luggage items at a first locus for later retrieval at a second locus.

Automated luggage delivery system 14 includes various delivery system segments indicated by representative delivery system segments 20, 22, 24, 26, 28 serving various portions of luggage handling system 10. Representative delivery system segments 20, 22, 24, 26, 28 are not a complete illustration of luggage delivery system 14; other delivery segments (not shown in FIG. 9) may be involved in completing luggage delivery system 14 from other check-in stations (not shown in FIG. 9) to other luggage embark/debark stations (not shown in FIG. 9). Representative delivery system segments 20, 22, 24, 26, 28 are operationally connected to enable delivery of luggage items from any of several check-in stations (represented by check-in station 12) to any of several luggage embark/debark stations (represented by luggage embark/debark stations 16, 17). In its preferred embodiment, luggage handling system 10 is capable of delivering items from any of several luggage embark/debark stations to various other luggage embark/debark stations (represented by luggage embark/debark stations 16, 17).

Delivery system segment 20 serves check-in station 12. Delivery system segment 28 serves luggage embark/debark station 16. Delivery system segments 24, 26 are branches emanating from delivery system segment 22. Delivery system segment 24 serves luggage embark/debark station 17. Delivery system segment 26 may be connected with delivery system segment 28, delivery system segment 26 may be connected with another delivery system segment (not shown in FIG. 9), or delivery system segment 26 may serve another luggage embark/debark station (not shown in FIG. 9).

Selecting which delivery system segment 24, 26 carries a luggage item delivered by delivery system segment 22 is effected by a selection apparatus 30. Selection apparatus 30 is illustrated in schematic form indicating that selection apparatus 30 may block either of delivery system segment 24, 26 to permit passage of a luggage item along the unblocked delivery system segment 24, 26. Other structures than the indicated blocking mechanism may be employed to embody selection apparatus 30 without straying from the scope of the present invention. Selection apparatus 30 is responsive to control from elsewhere in luggage handling system 10. For example, selection apparatus 30 may be controlled from luggage handling system control appliance 18. Control of various aspects of luggage handling system 10 may be carried out via hard-wired connections, using wireless control connections, by other control connections or by a combination of control arrangements.

Luggage handling system control appliance 18 includes a control section 32 and a communication section 34. Control section 32 and communication section 34 cooperate to manage luggage handling system 10. Luggage handling system 10 includes a plurality of wireless transceiver stations 42, 44, 46, 48. Connections among luggage handling system control appliance 18 and wireless transceiver stations 42, 44, 46, 48 may be established via hard-wired connections, using wireless connections, by other connections or by a combination of connection arrangements. Luggage handling system control appliance 18 and wireless transceiver stations 42, 44, 46, 48 establish an impulse radio network. Wireless transceiver stations 42, 44, 46, 48 are preferably situated appropriately to be able to communicate with radio frequency (RF) tags attached with luggage items traversing luggage delivery system 14. Most preferably, wireless transceiver stations 42, 44, 46, 48 are situated appropriately that at least two of wireless transceiver stations 42, 44, 46, 48 are in communication with a RF tag attached with a luggage item wherever the luggage item may be located in the facility in which luggage handling system 10 is installed. Such an ability to provide communication coverage by at least two of wireless transceiver stations 42, 44, 46, 48 ensures that RF tags attached with luggage items may be uninterruptedly evaluated for information programmed into respective RF tags, and signals broadcast by respective RF tags may be evaluated to ascertain respective locations of respective RF tags.

Check-in station 12 includes a check-in terminal 13. Check-in terminal 13 is connected with luggage handling system control appliance 18. An owner-passenger 50 approaches check-in station 12 for check-in via check-in terminal 13. Check-in terminal 13 may be an automated terminal facilitating entry of information therein by owner-passenger 50. In another embodiment of the present invention an attendant 52 receives a luggage item 56 (i.e., at least one luggage item) from owner-passenger 50. A portable impulse radio communication device, preferably embodied in a radio frequency (RF) tag 54 is attached with luggage item 56. During the check-in process, attendant 52 enters appropriate information into check-in terminal 13 to enable identification of luggage item 56. By way of example, information that may be entered into check-in terminal 13 may include an identifier for RF tag 54, the name of the owner-passenger, the flight number (or numbers, for a multi-leg flight itinerary) to be ridden by the owner-passenger. Data stored (or available to) luggage handling system control appliance 18 will be provided so that check-in terminal 13 (or another device driven by check-terminal 13) can populate RF tag 54 with indicators relating information entered at check-in terminal 13, plus other relevant information, such as an embarkation locus for luggage item 56 (and subsequent embarkation loci at interim facilities involved with a multi-leg itinerary), and a debarkation locus at the termination facility of the owner-passenger's travel itinerary.

RF tag 54 communicates with at least one of wireless transceiver stations 42, 44, 46, 48. Preferably RF tag 54 communicates with three or more of wireless transceiver stations 42, 44, 46, 48. In a simplex embodiment, RF tag 54 is impressed (or otherwise has entered therein) information regarding at least one item relating to luggage item 56 at check-in terminal 13, as described above. RF tag 54 thereafter transmits in broadcast fashion parameters indicating the impressed information. Transmission by RF tag 54 may be continuous, periodic, responsive to an interrogation signal transmitted by one or more of wireless transceiver stations 42, 44, 46, 48 or a combination of such transmission arrangements. In a simplex embodiment of the present invention, no transmission is effected from any of wireless transceiver stations 42, 44, 46, 48 to RF tag 54. Wireless transceiver stations 42, 44, 46, 48 are situated in order that more than one, and preferably three or more of wireless transceiver stations 42, 44, 46, 48 will receive transmitted information from RF tag 54 in order that information may be provided to luggage handling system control appliance 18 for determining location of RF tag 54 in two or three dimensions.

Another embodiment of the present invention contemplates construction of RF tag 54 with a capability to receive changes in impressed information via change information transmitted from at least one of wireless transceiver stations 42, 44, 46, 48. In such an embodiment, changes in flight plans or changes in gate information that may occasion a change in embarkation locus for a particular luggage item 56 may be transmitted to a RF tag 54 attached with the particular luggage item 56. In such an embodiment it is preferred that a reaction to such a change-signal effecting a change in impressed information be manifested by RF tag 54 in order to alert human operators that the particular luggage item 56 has experienced a change in impressed information and some special handling may be required for that affected particular luggage item 56. Such a response may be embodied in a response-indication transmission by RF tag 54 to at least one of wireless transceiver stations 42, 44, 46, 48 for relay to luggage handling system control appliance 18. Luggage handling system control appliance 18 may react to receiving such a response-indication signal by alerting a human operator nearest to the then extant locus of luggage item 56 in order that the human operator may retrieve luggage item 56 and arrange for its rerouting to the new embarkation locus. The alerting of human operators may be carried out by alerting a monitoring station near the extant locus of luggage item 56 (not shown in FIG. 9), by alerting a portable monitoring station carried by the human operator, or by other alerting arrangements or a combination of alerting arrangements.

In a luggage handling system 10 that is more automated, luggage item 56 may be resting in an identifiable locus, such as a particular bin at a particular first embarkation locus 16. In such an automated environment, luggage handling system control appliance 18 may react to a response-indication signal identifying luggage item 56 as requiring attention by automatically directing off loading of luggage item 56 upon an adjacent delivery system segment of delivery system segments 20, 22, 24, 26, 28 for automatic transport to a new embarkation locus 17.

Another embodiment of RF tag 54 may present a lighted alert, such as a light emitting diode (LED) included in RF tag 54 that is displayed upon receipt of a change-signal. Such a lighted indication serves to alert a human operator that lighted luggage item 56 requires attention. Reader terminals associated with luggage handling system 10 (not shown in FIG. 9), displaying information provided using luggage handling system control appliance 18 may then be consulted by a human operator, such as a luggage handler to ascertain the action required. There is also an ability provided for turning off the lighted indicator. Reader terminals may be fixed stations or portable stations carried by luggage handlers.

In such manner, a human operator 60, such as a luggage handler, in the vicinity of embark/debark locus 16 may note a lighted indication on a RF tag 54a carried upon luggage item 56a, indicating that luggage item 56a requires special attention. Human operator 60 may consult an available reader terminal (fixed or portable) to ascertain appropriate action required for attending to luggage item 56a.

On arrival at a destination facility, or at an interim facility in the case of a multi-leg trip itinerary, a luggage handling system at the destination facility may be employed to transmit debarkation locus information to aid in routing luggage item 56 to a proper debarkation locus, either for further transport in a next leg of a trip itinerary or for retrieval by owner-passenger 50. Change-signals generated and communicated by a luggage handling system 10 at a destination facility can provide up-to-date debarkation locus information to RF tag 54 after arrival at the destination facility.

Figure 10:
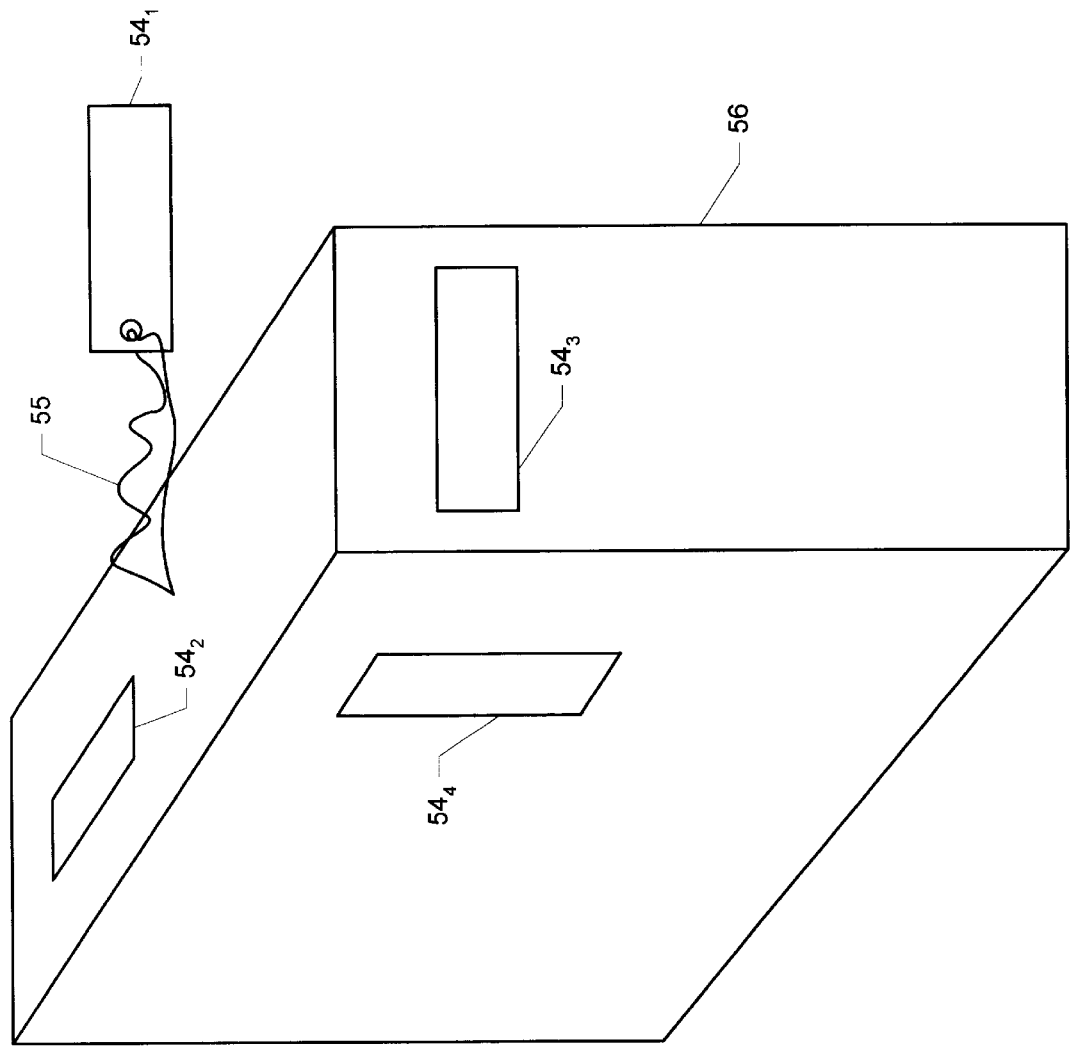
FIG. 10 is a schematic diagram illustrating alternate exemplary placement arrangements for attaching a portable communication tag with a luggage item according to the present invention.

FIG. 10 is a schematic diagram illustrating alternate exemplary placement arrangements for attaching a portable communication tag with a luggage item according to the present invention. In FIG. 10, a luggage item 56 has exemplary RF tags $54_1$, $54_2$, $54_3$, $54_4$ attached. In practice, it is preferable that only one RF tag is required for each luggage item 56. FIG. 10 serves to emphasize that orientation of RF tag $54_1$, $54_2$, $54_3$, $54_4$ is irrelevant to proper operation of luggage handling system 10 (FIG. 9). RF tags $54_2$, $54_3$, $54_4$ are attached with luggage item 56 in various fixed orientations, as by adhesive or a similar attachment mechanism. RF tag $54_1$ is attached with luggage item 56 by a tether 55, such as a string, elastic cord or similar attachment mechanism. Tether 55 allows RF tag $54_1$ to substantially freely turn on tether 55. Even if RF tag $54_1$ is bent, folded or turned with either side facing luggage item 56, impulse radio communication may be established by RF tag $54_1$ with selected wireless transceiver stations of wireless transceiver stations 42, 44, 46, 48 (FIG. 9).

Figure 11:
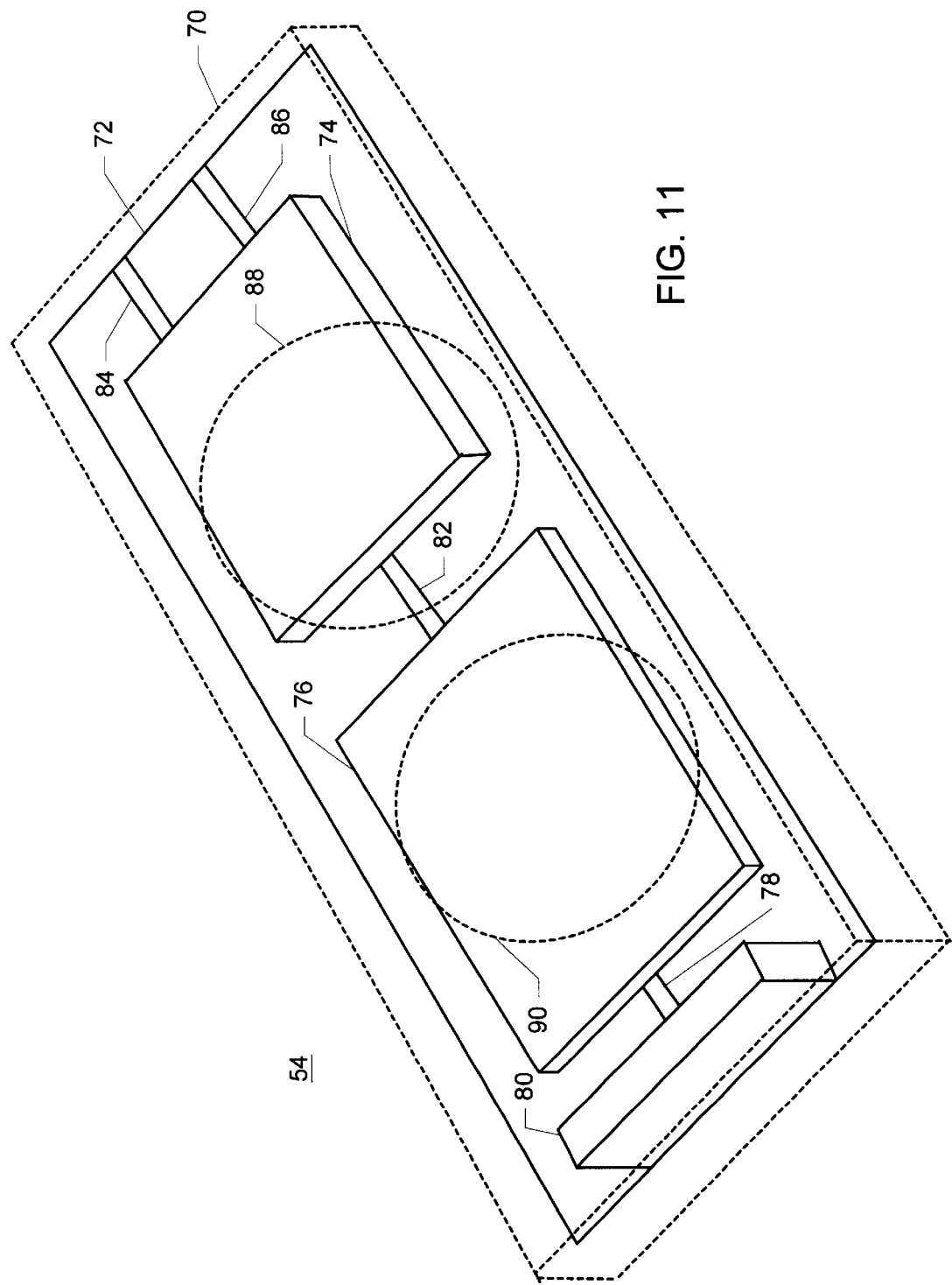
FIG. 11 is a schematic diagram illustrating principal portions of an exemplary portable communication tag according to the present invention.

FIG. 11 is a schematic diagram illustrating principal portions of an exemplary portable communication tag according to the present invention. In FIG. 11, a RF tag 54 includes a housing 70 (illustrated in phantom) enclosing a substrate 72 on which are arrayed a power supply section 74 and a control section 76. Coupled with control section 76 via a circuit trace 78 is an alert device 80. A circuit trace 82 connects power supply section 74 with control section 76. Circuit traces 84, 86 provide access to power supply section 74 from outside housing 70 to facilitate recharging power supply section 74.

Antenna elements 88, 90 are connected with control section 76. Details of the connection are within the ken of one skilled in the art of RF circuit design and are therefore not illustrated in FIG. 11. Connections with antenna elements 88, 90 are arranged to provide a transmit or receive capability, or both transmit and receive capabilities, for RF tag 54. Antenna elements 88, 90 are illustrated in phantom indicating an exemplary arrangement in which antenna elements 88, 90 are arrayed on substrate 72 on a side opposite the side upon which power supply section 74 and control section 76 are arrayed. Other arrangements for antenna elements 88, 90 are also appropriate for constructing RF tag 54. Attachment of RF tag 54 to a luggage item 56 may be effected using adhesive, a tether, or another attachment medium (FIG. 10).

Circuit traces 78, 82, 84, 86 are schematic representations of connections required to effect appropriate operational couplings among power supply section 74, control section 76, alert device 80 and antenna elements 88, 90. Accordingly, circuit traces 78, 82, 84, 86 may each be a single circuit connection or a plurality of circuit paths carried upon one or both sides of substrate 72.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

What is claimed is:

1. A system for managing luggage handling; the system comprising:
   (a) a central information management appliance;
   (b) a plurality of portable impulse radio communication devices;
   (c) at least one impulse radio transceiving instrument; and
   (d) at least one luggage delivery device;
   said at least one impulse radio transceiving instrument, said plurality of communication devices, said at least one luggage delivery device and said central information management appliance being in communication; selected portable impulse radio communication devices of said plurality of portable impulse radio communication devices being coded communication devices; respective said coded communication devices being attached with respective luggage items and communicating indication of location of each said respective luggage item and at least one other item relating to each said respective luggage item; said at least one luggage delivery device employing said indication of location and said indication of at least one other item to deliver each said respective luggage item to a locus in the system.

2. A system for managing luggage handling as recited in claim 1 wherein said coded communication devices include an alerting feature; said alerting feature being actuated by a signal from at least one of said at least one impulse radio transceiving instrument.

3. A system for managing luggage handling as recited in claim 1 wherein said coded communication devices include a rechargeable power source.

4. A system for managing luggage handling as recited in claim 2 wherein said coded communication devices include a rechargeable power source.

5. A system for managing luggage handling as recited in claim 1 wherein said coded communication devices are transceiving communication devices; said transceiving communication devices being configured to enable remote alteration of said indication of at least one other item using at least one of said at least one impulse radio transceiving instrument.

6. A system for managing luggage handling as recited in claim 2 wherein said coded communication devices are transceiving communication devices; said transceiving communication devices being configured to enable remote alteration of said indication of at least one other item using at least one of said at least one impulse radio transceiving instrument.

7. A system for managing luggage handling in a passenger facility; said passenger facility including at least one passenger check-in station; the system comprising:
   (a) at least one information management appliance;
   (b) a plurality of portable impulse radio communication devices;
   (c) at least one impulse radio transceiving instrument; and
   (d) at least one luggage delivery device; said at least one passenger check-in station, said at least one impulse radio transceiving instrument, said plurality of portable communication devices, said at least one luggage delivery device and said at least one information management appliance being in communication; selected portable impulse radio communication devices of said plurality of portable impulse radio communication devices being coded communication devices; respective said coded communication devices being attached with respective luggage items; each said respective luggage item being scheduled for travel via a particular conveyance to a particular destination; said respective coded communication device communicating indication of location of each said respective luggage item and selected parameters relating to each said respective luggage items; said at least one luggage delivery device employing said indication of location and said indication of said selected parameters to deliver each said respective luggage item to a locus in the system.

8. A system for managing luggage handling in a passenger facility as recited in claim 7 wherein said selected parameters include indication of at least one of said particular conveyance and said particular destination.

9. A system for managing luggage handling in a passenger facility as recited in claim 7 wherein said respective coded communication devices are programmed for communicating said selected parameters at one passenger check-in station of said at least one passenger check-in station.

10. A system for managing luggage handling in a passenger facility as recited in claim 7, 8 or 9 wherein said coded communication devices include an alerting feature; said alerting feature being actuated by a signal from at least one of said at least one impulse radio transceiving instrument to indicate to an observer that at least one of said selected parameters has changed.

11. A system for managing luggage handling in a passenger facility as recited in claim 10 wherein said alerting feature comprises an impulse radio communication alerting signal; said alerting signal being received by at least one of said at least one impulse radio transceiving instrument.

12. A system for managing luggage handling in a passenger facility as recited in claim 10 wherein said alerting feature comprises a visual indicating device.

13. A method for managing luggage handling; the method comprising the steps of:
   (a) providing a central information management appliance;

(b) providing a plurality of portable impulse radio communication devices;

(c) providing at least one impulse radio transceiving instrument;

(d) providing at least one luggage delivery device;

(e) equipping said at least one impulse radio transceiving instrument, said plurality of communication devices; said at least one luggage delivery device and said central information management appliance for effecting communication;

(f) equipping selected portable impulse radio communication devices of said plurality of portable impulse radio communication devices for operation as coded communication devices; respective said coded communication devices being attached with respective luggage items and communicating indication of location of each said respective luggage item at least one other item relating to each said respective luggage item; and (g) operating said at least one luggage delivery device to employ said indication of location and said indication of at least one other item to deliver said respective luggage item to a locus in the system.

14. A method for managing luggage handling as recited in claim 13 wherein the method comprises the further step of:

(h) equipping said coded communication devices to include an alerting feature; said alerting feature being actuated by a signal from at least one of said at least one impulse radio transceiving instrument.

15. A method for managing luggage handling as recited in claim 13 wherein the method comprises the further step of:

(h) equipping said coded communication devices to include a rechargeable power source.

16. A method for managing luggage handling as recited in claim 14 wherein the method comprises the further step of:

(i) equipping said coded communication devices to include a rechargeable power source.

17. A method for managing luggage handling as recited in claim 15 wherein the method comprises the further step of:

(i) equipping said coded communication devices for operation as transceiving communication devices to enable remote alteration of said indication of at least one other item using at least one of said at least one impulse radio transceiving instrument.

18. A method for managing luggage handling as recited in claim 16 wherein the method comprises the further step of:

(j) equipping said coded communication devices for operation as transceiving communication devices to enable remote alteration of said indication of at least one other item using at least one of said at least one impulse radio transceiving instrument.

19. A system for managing handling of luggage items at an airport; said airport including at least one passenger check-in station and a plurality of luggage-handling stations; respective said luggage items being transferred between airplanes and said airport at said plurality of luggage-handling stations; the system comprising:

(a) at least one information management appliance;

(b) a plurality of portable impulse radio communication devices;

(c) at least one impulse radio transceiving instrument; and (d) at least one luggage delivery device;

said at least one passenger check-in station; said at least one impulse radio transceiving instrument, said plurality of portable communication devices; said at least one luggage delivery device and said at least one information management appliance being in communication; selected portable impulse radio communication devices of said plurality of portable impulse radio communication devices being coded communication devices; respective said coded communication devices being attached with respective luggage items; each said respective luggage item being scheduled for travel via a particular flight to a particular destination; said respective coded communication device communicating indication of location of each said respective luggage item and selected parameters relating to each said respective luggage item; said at least one luggage delivery device employing said indication of location and said indication of said selected parameters to deliver each said respective luggage item to a respective luggage-handling station of said plurality of luggage-handling stations.

20. A system for managing handling of luggage items at an airport as recited in claim 19 wherein said selected parameters include indication of at least one of said particular flight and said particular destination.

21. A system for managing handling of luggage items at an airport as recited in claim 19 wherein said respective coded communication devices are programmed for communicating said selected parameters at one passenger check-in station of said at least one passenger check-in station.

22. A system for managing luggage handling in a passenger facility as recited in claim 19, 20 or 21 wherein said coded communication devices include an alerting feature; said alerting feature being actuated by a signal from at least one of said at least one impulse radio transceiving instrument to indicate to an observer that at least one of said selected parameters has changed.

23. A system for managing luggage handling in a passenger facility as recited in claim 22 wherein said alerting feature comprises an impulse radio communication alerting signal; said alerting signal being received by at least one of said at least one impulse radio transceiving instrument.

24. A system for managing luggage handling in a passenger facility as recited in claim 22 wherein said alerting feature comprises a visual indicating device.

25. A method for controlling a delivery apparatus; said delivery apparatus delivering respective selected objects of a plurality of objects to respective assigned loci of a plurality of loci; the method comprising the steps of:

(a) attaching an impulse radio transmitter device to each said selected object;

(b) employing a respective said impulse radio transmitter device to transmit identifying information relating to its respective attached selected object to an impulse radio receiver device;

(c) employing impulse radio broadband positioning to ascertain position information relating to said attached selected object; and (d) employing said identifying information and said position information to control said delivery apparatus to effect delivery of said selected object to its respective assigned locus.

26. A method for controlling a delivery apparatus as recited in claim 25 wherein said plurality of objects are a plurality of luggage pieces.

27. A method for controlling a delivery apparatus as recited in claim 25 wherein said delivery apparatus is a luggage delivery apparatus and wherein said plurality of loci are associated with a passenger terminal facility.

28. A system for controlling a delivery apparatus; said delivery apparatus delivering respective selected objects of a plurality of objects to respective assigned loci of a plurality of loci; the system comprising:

(a) a first impulse radio attached to a respective said selected object;

(b) a second impulse radio communicatively coupled with said first impulse radio; said first impulse radio conveying identifying information relating to said respective selected object to said second impulse radio; and (c) a delivery apparatus coupled with said second impulse radio; said delivery apparatus employing impulse radio broadband positioning to ascertain position information relating to said respective selected object; said delivery apparatus employing said identifying information and said position information to control said delivery apparatus to effect delivery of said respective selected object to its respective assigned locus.

29. A system for controlling a delivery apparatus as recited in claim 28 wherein said plurality of objects are a plurality of luggage pieces.

30. A system for controlling a delivery apparatus as recited in claim 28 wherein said delivery apparatus is a luggage delivery apparatus and wherein said plurality of loci are associated with a passenger terminal facility.

* * * * *